T. H. BLAIR.
MOVING PICTURE MACHINE.
APPLICATION FILED SEPT. 8, 1913.
1,247,786.
Patented Nov. 27, 1917.
2 SHEETS—SHEET 2.
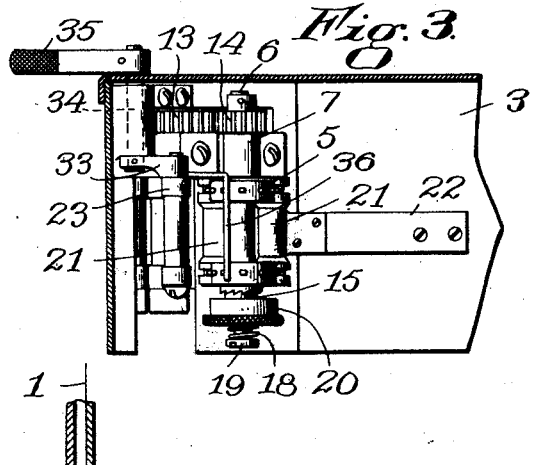
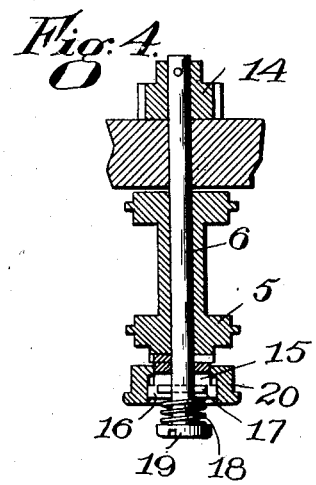
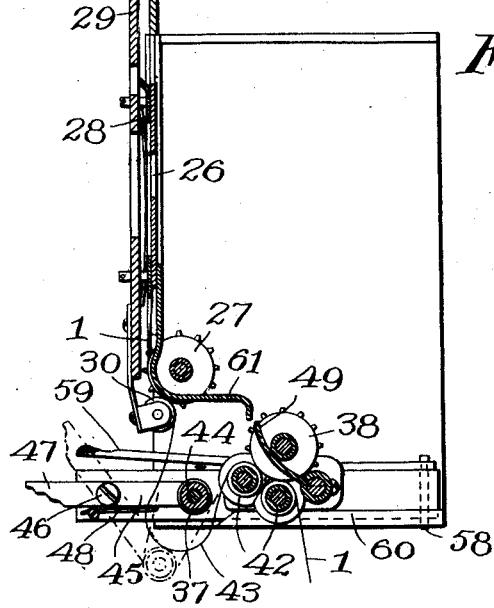
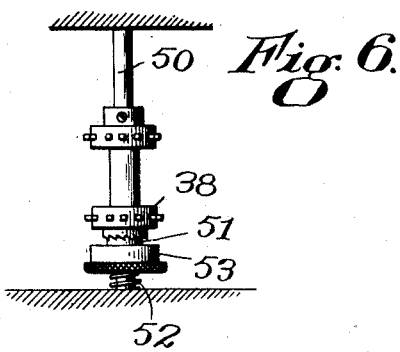
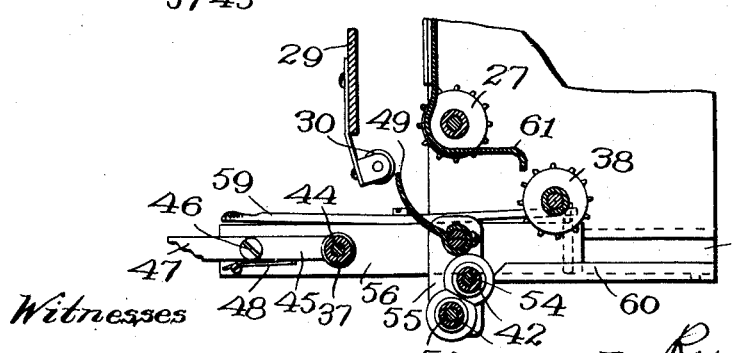
Inventor
Thomas H. Blair.
By Rufus B. Fowler
Attorney
Witnesses
R. D. Tolman.
Penelope Cumberbach.

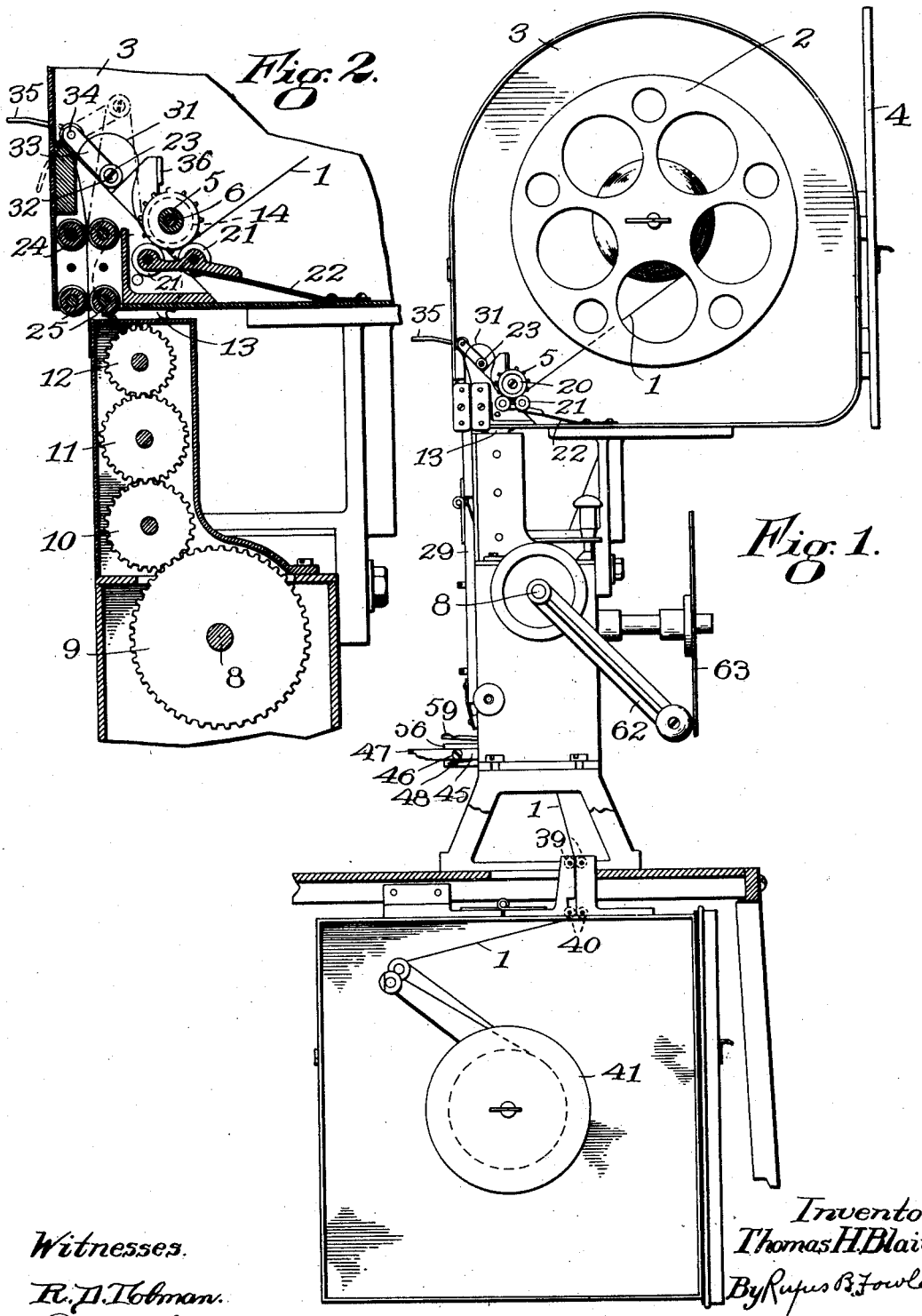

UNITED STATES PATENT OFFICE.

THOMAS H. BLAIR, OF NORTHBORO, MASSACHUSETTS.

MOVING-PICTURE MACHINE.

1,247,786.   Specification of Letters Patent.   Patented Nov. 27, 1917.

Application filed September 8, 1913. Serial No. 788,507.

*To all whom it may concern:*

Be it known that I, THOMAS H. BLAIR, a citizen of the United States, residing at Northboro, in the county of Worcester and Commonwealth of Massachusetts, have invented a new and useful Improvement in Moving-Picture Machines, of which the following, together with the accompanying drawings, is a specification.

My invention relates to moving picture machines and more particularly to mechanism for feeding a picture film intermittently past the lens and shutter of a machine of this class.

One object of the invention is to provide improved mechanism for forming and maintaining loops in the strip of film at each side of the intermittently rotatable film feeding wheel so that the effect of the sudden starting and stopping of the film by this wheel cannot be transmitted beyond the loops to other portions of the machine. The strip of film is fed from the supply reel to the first loop and from the second loop to the takeup reel by film feeding wheels which rotate continuously so that the motion of the film from one reel to the other is smooth and continuous except for a short portion between the two loops.

Other objects and advantages will appear from the following description taken in connection with the accompanying drawings, in which Figure 1 is a side elevation of the moving picture machine with its film feeding mechanism constructed in accordance with my invention; Fig. 2 is a side view of the mechanism for forming and maintaining the loop in the strip of film between the supply reel and the intermittently rotatable film feeding wheel; Fig. 3 is a plan view of the loop forming mechanism shown in Fig. 2; Fig. 4 is an enlarged sectional view of the continuously rotatable film feeding wheel for maintaining the loop between the supply reel and the intermittently rotatable film feeding wheel; Fig. 5 is a side elevation, partially in section, of the intermittently rotatable film feeding wheel and the mechanism for forming and maintaining a loop in the strip of film between this intermittently rotatable wheel and the take-up reel; Fig. 6 is a plan view of the continuously rotatable wheel which feeds the strip of film from the last loop to the takeup reel; and Fig. 7 is a view similar to that shown in Fig. 5, but with the parts in different positions.

Like reference characters refer to similar parts in the different figures.

In the form of the invention shown in the drawings, the strip of film 1 is placed in the machine upon a supply reel 2 located in a casing 3 having a door 4 to exclude dust and protect the film. The film is drawn from the reel 2 and fed toward the lens by a film feeding wheel or sprocket 5. The sprocket 5 is mounted loosely upon a shaft 6 rotatably supported by a bearing 7. The shaft 6 is driven from the main shaft 8 by a series of gear wheels or pinions 9, 10, 11, 12, 13 and 14, the last pinion 14 being secured to the shaft 6. The outer end face of the sprocket 5 is provided with radial teeth to engage corresponding radial teeth in the inner face of a sleeve 15 surrounding the outer end of the shaft 6. The sleeve 15 has a diametrical slot 16 which receives the ends of a pin 17 passing through the shaft 6, the sleeve 15 being thus free to slide longitudinally of the shaft 6 to carry its teeth into and out of engagement with the teeth on the sprocket 5, but being compelled to rotate with the shaft 6. The sleeve 15 is forced toward the sprocket 5 to keep its teeth in engagement with the teeth of the sprocket by a spring 18 confined between the sleeve 15 and a screw 19 at the end of the shaft 6. A second sleeve 20 surrounds the sleeve 15 and is free to rotate thereon so that it may be seized by the operator while the sleeve 15 is rotating. The sleeves 15 and 20 are formed with engaging shoulders so that, by forcing the sleeve 20 away from the sprocket 5, the sleeve 15 may be moved against the force of the spring 18 to disengage it from the sprocket 5 either while the machine is in operation or at rest. The teeth on the sprocket 5 and on the sleeve 15 are of saw tooth shape and slant in such direction that there will be positive driving engagement between them to feed the film forwardly or away from the supply reel 2. When there is a pull upon the film beyond the sprocket 5, however, the teeth on the sleeve 15 and the sprocket 5 will act as cams to separate the sleeve from the sprocket so as to allow the sprocket to turn and the film to move forwardly without corresponding rotation of the sleeve 15 and shaft 6. The film is held yieldingly in engagement with the teeth of the sprocket 5 by a pair of rolls 21 supported by a spring 22 fastened to a suitable fixed support.

After leaving the sprocket 5 the film passes over a roller 23, thence between pairs of guide rolls 24 and 25 and past the picture aperture 26 to the intermittently rotatable film feeding wheel or sprocket 27. As the film passes the picture aperture 26 it is held yieldingly in contact with the edges of the opening by a spring pressed plate 28 carried by a supporting plate 29. A roller 30, also supported by the plate 29, holds the film in engagement with the sprocket 27. The supporting plate 29 is mounted in any suitable manner so that it may be moved away from the sprocket 27, as indicated in Fig. 7, to allow the film to be started through the machine or removed therefrom.

The film is moved at uniform speed, so long as the speed of the main driving shaft 8 does not change, in order that it may be withdrawn evenly and smoothly from the supply reel 2. The film passes the sprocket 27, however, with an intermittent motion, the starting and stopping of the film at this point being very sudden and in rapid succession. It is important, therefore, that a free loop 31 be formed in the film between the sprockets 5 and 27 in order that the sudden shortening of this section of the film, each time that the sprocket 27 feeds it along, may not tighten it so as to enlarge it or interfere with its proper passage through the machine. The average speed of the sprockets 5 and 27 are equal so that when the loop 31 is once formed it will remain, its size, however, being alternately increased and decreased somewhat by the intermittent motion of the sprocket 27. The roller 23 is carried on a spindle 32 extending from the free end of an arm 33. The arm 33 is secured to one end of a shaft 34, the other end of this shaft being provided with a lever 35 for turning it. If, after the film is placed in the machine, the loop 31 is found to be too small, the lever 35 is depressed so as to lift the roller 23, as shown in dotted lines in Fig. 2, thus enlarging the loop 31. The raising of the roller 23 cannot, of course, affect the state of rest or motion of the sprocket 27 before the spring 18 yields to allow the film to pass by the sprocket 5 as has been described. It is obvious that this loop may be formed or enlarged either while the machine is at rest or while it is in operation. A stripper 36 prevents the film from following the teeth of the sprocket 5 too far.

After leaving the sprocket 27, the film passes below a roller 37, thence past a third film feeding wheel or sprocket 38 and between pairs of guide rolls 39 and 40 to a takeup reel 41 which may be operated in any desired manner. The film is held in engagement with the teeth of the sprocket 38 by a pair of rolls 42. The sprocket 38 is geared to the main driving shaft 8 so that it will rotate continuously and at the same speed as that of the sprocket 5 and also at the same average speed as that of the intermittently rotatable sprocket 27. The sprocket 38 rotates continuously and uniformly, except as its speed is changed by variations in the speed of the main driving shaft 8, so that the film will be fed to the takeup reel smoothly and evenly and free from the effect of the intermittent motion of the sprocket 27.

It is important that a loop 43 be formed in the film between the sprockets 27 and 38 for the same reason that the loop 31 was important between the sprockets 5 and 27. The roller 37 is carried on a spindle 44 extending from the free end of an arm 45. The arm 45 is supported on a pivot 46 and is extended beyond the pivot to form a lever 47 for moving it together with the roller 37 about the pivot. The roller 37 is held in its uppermost position by a spring 48. After the film is placed in the machine, the loop 43 may be formed or enlarged by raising the lever 47 so as to depress the roller 37, as indicated in dotted lines in Fig. 5. The additional film for the loop is drawn past the sprocket 38 in the same manner that the additional film for the loop 31 is drawn past the sprocket 5. To permit the film to pass the sprocket 38 for this purpose, the sprocket 38 is mounted loosely on a shaft 50 which carries a sleeve 51 having radial teeth engaging similar teeth in the end face of the sprocket 38. The teeth on the sleeve 51 and on the sprocket 38 are held yieldingly in engagement by a spring 52 confined between the sleeve 51 and the frame of the machine. The outer sleeve 53, surrounding the sleeve 51, is provided for the purpose of disengaging the teeth on the sleeve 51 and on the sprocket 38. The construction of the driving connections between the shaft 50 and the sprocket 38 is similar to that of the driving connections between the shaft 6 and the sprocket 5 which has already been described in detail. Inasmuch, however, as the motion of the sprocket 38 necessary to allow additional film to be drawn into the loop 43 is opposite to its normal film feeding motion, the teeth on the sleeve 51 and the sprocket 38 are slanted in opposite directions from the teeth on the sleeve 15 and the sprocket 5. The rolls 42 are carried on spindles 54 extending from a small plate 55 pivoted to a slide 56 which is supported in a slot 57 formed in the frame of the machine. The slide 56 is held in its normal position, as shown in Figs. 1 and 5, by a pin 58. By depressing the forward end of a lever 59, the pin 58 is raised so as to release the slide 56 and the slide may then be withdrawn to the position shown in Fig. 7. This withdrawal of the slide separates the rolls 42 from the sprocket 38 so that the film may be started through the machine or removed therefrom. The stripper 49 and the roller 37 with their supports are also moved away from the sprocket 38 with the slide 56 so that they may not interfere while the film is being placed in the machine or removed therefrom. When the slide 56 is in its normal position as shown most clearly in Fig. 5, the plate 55 rests on the upper edge of a flange 60 so as to press the rolls 42 against the sprocket 38. When the slide 56 is withdrawn, as shown in Fig. 7, the plate 55 passes beyond the end of the flange 60 so that it drops into a vertical position and away from the roller 37, the rolls 42 dropping with it so that the film may be more evenly and easily passed over them. A stripper 61 prevents the film from following the teeth of the sprocket 27 too far. A handle 62 is secured to the main driving shaft 8 for operating the machine and the usual type of shutter 63 rotates in front of the lens while the pictures are being projected.

Moving picture machines have been produced in which a loop in the film has been maintained between the intermittently rotatable sprocket and a continuously rotatable sprocket. One objection to these machines has been, however, that if the intermittently rotatable sprocket ceases to feed the film at any time and the continuously rotatable sprocket continues to feed the film so that the size of the loop is increased considerably, the excess film in the loop would be very liable to be injured by contact with other parts of the machine, such as the lamp or moving gear wheels. This is sometimes caused by the sudden starting and stopping of the intermittently rotatable sprocket which tears out the perforated edges of the film so that it cannot longer feed it. An important feature of this invention resides in the location and arrangement of the continuously rotatable sprocket 5 and the mechanism associated therewith within the casing 3 for forming and maintaining the loop 31 in the film. This loop forming and maintaining mechanism is located within the casing 3 so that, in case the loop is suddenly and considerably enlarged, the excess film will be confined within the casing 3 so that it cannot come into contact with and be injured by the lamp and other moving portions of the machine outside this casing. The loop forming and maintaining mechanism is also arranged to hold the loop substantially parallel to the periphery of the reel 2 so that, if it becomes suddenly enlarged or elongated as described, it will follow around between the periphery of the reel and the wall of the casing so as not to be creased or otherwise injured by being crowded into a small space, thus obviating the necessity of stopping the machine quickly. After either of the loops 31 and 43 has been enlarged beyond its normal size, its size may be decreased by pulling out the sleeve 20 or the sleeve 53 so as to disengage the proper sprocket from its driving shaft and then drawing the film past the sprocket. In the case of the loop 31, the loop may be decreased in size while the machine is running by merely disengaging the sprocket 5 from its driving shaft 6, the feeding forward of the film by the other sprockets 27 and 38 causing the loop to decrease in size while the sprocket 5 is idle. In case, therefore, the intermittently rotatable sprocket 27 fails to feed the film during a short interval only so that the loop 31 is undesirably enlarged but does not continue to grow larger after the sprocket 27 begins again to feed the film, this loop may be decreased to its normal size by merely pulling out the sleeve 20 for an instant.

While I have shown and described the details of one form of my invention, I do not wish to be limited to such details as changes may be made without departing from the spirit of the invention; but having described my invention, what I claim as new and desire to secure by Letters Patent is:

1. In a moving picture machine, film feeding mechanism including a supply reel for the film, a protecting casing inclosing the reel, means for forming and maintaining a loop in the film within the casing containing said supply reel, and means for holding said loop substantially parallel to the periphery of said reel.

2. In a moving picture machine, film feeding mechanism including a supply reel for the film, a constantly operating film feeding wheel, and an intermittently operating film feeding wheel, a manually operated member engaging the film between said wheels, and adapted by its movement to form a loop of predetermined size in said film, and a casing inclosing said reel and said loop formed in the film.

3. In a moving picture machine, film feeding mechanism including a supply reel for the film, a protecting casing inclosing the reel, and means for maintaining a loop in that portion of the film contained within the casing with the direction of the loop substantially tangent to the periphery of the reel.

THOMAS H. BLAIR.

Witnesses:
PENELOPE COMBERBACH,
RUFUS B. FOWLER.